United States Patent
Naccache et al.

(10) Patent No.: US 10,491,570 B2
(45) Date of Patent: Nov. 26, 2019

(54) METHOD FOR TRANSMITTING DATA, METHOD FOR RECEIVING DATA, CORRESPONDING DEVICES AND PROGRAMS

(71) Applicant: Ingenico Group, Paris (FR)

(72) Inventors: David Naccache, Paris (FR); Remi Geraud, Anthony (FR); Marc Beunardeau, Paris (FR)

(*) Notice: Subject to any disclaimer, the term of this patent is extended or adjusted under 35 U.S.C. 154(b) by 141 days.

(21) Appl. No.: 15/388,411

(22) Filed: Dec. 22, 2016

(65) Prior Publication Data

US 2017/0187692 A1    Jun. 29, 2017

(30) Foreign Application Priority Data

Dec. 24, 2015  (FR) .................................... 15 63338

(51) Int. Cl.
*H04L 29/06* (2006.01)
*H04L 9/14* (2006.01)

(52) U.S. Cl.
CPC ............ *H04L 63/0428* (2013.01); *H04L 9/14* (2013.01); *H04L 63/06* (2013.01)

(58) Field of Classification Search
CPC ....... H04L 63/0428; H04L 63/06; H04L 9/08; H04L 9/14; H04L 9/3239
USPC ................ 709/227, 236; 713/150, 160, 168; 726/30
See application file for complete search history.

(56) References Cited

U.S. PATENT DOCUMENTS

| | | | | |
|---|---|---|---|---|
| 5,852,665 A | * | 12/1998 | Gressel | H04L 9/0894 380/30 |
| 6,253,326 B1 | * | 6/2001 | Lincke | H04L 29/06 726/12 |
| 6,401,145 B1 | * | 6/2002 | Baskey | G06F 3/061 709/232 |
| 7,353,299 B2 | * | 4/2008 | Hattrup | H04L 29/06 710/30 |
| RE40,459 E | * | 8/2008 | Hawkins | H04L 67/2823 709/219 |
| 7,697,681 B2 | * | 4/2010 | Leech | H04L 9/0637 380/28 |
| 8,412,682 B2 | * | 4/2013 | Zheng | G06F 3/0608 707/687 |
| 8,719,345 B2 | * | 5/2014 | Reguna | H04L 67/1095 709/204 |
| 9,003,200 B1 | | 4/2015 | Gardner | |
| 9,678,678 B2 | * | 6/2017 | Gakhal | G06F 3/0619 |

(Continued)

*Primary Examiner* — Saleh Najjar
*Assistant Examiner* — Khalid M Almaghayreh
(74) *Attorney, Agent, or Firm* — Benoit & Coté Inc.

(57) ABSTRACT

The disclosure relates to a method for transmitting data and to a corresponding method for receiving data. According to the disclosure, in the method for transmitting data, a cryptographic processing operation is performed on the data to be transmitted, after this data has been pre-subdivided into blocks of data, and a tag representing each block of encrypted data is computed. The tag is then transmitted in such a way that a hacker in not able to reproduce a correct transmission of tags. The method of reception, for its part, ensures that when an incorrect tag is received (because of a hacking attempt), the processing of the data blocks is not immediately stopped but a differential processing is implemented in order to jam an attempt to analyze the behavior of the receiver.

9 Claims, 3 Drawing Sheets

(56) References Cited

U.S. PATENT DOCUMENTS

| | | | | |
|---|---|---|---|---|
| 10,015,152 | B2* | 7/2018 | Resch | H04L 67/1097 |
| 2002/0051537 | A1* | 5/2002 | Rogaway | H04L 9/0643 |
| | | | | 380/46 |
| 2002/0071552 | A1* | 6/2002 | Rogaway | H04L 9/0637 |
| | | | | 380/37 |
| 2002/0083187 | A1* | 6/2002 | Sim | H04L 47/125 |
| | | | | 709/235 |
| 2010/0064354 | A1* | 3/2010 | Irvine | G06F 21/6218 |
| | | | | 726/5 |
| 2010/0262714 | A1* | 10/2010 | Hiie | H04L 65/4007 |
| | | | | 709/234 |
| 2010/0293097 | A1* | 11/2010 | Pomeroy | H04L 63/0457 |
| | | | | 705/58 |
| 2011/0185247 | A1* | 7/2011 | Gavrilov | H04L 47/10 |
| | | | | 714/748 |
| 2011/0202755 | A1* | 8/2011 | Orsini | H04L 63/029 |
| | | | | 713/151 |
| 2017/0187692 | A1* | 6/2017 | Naccache | H04L 9/3239 |

* cited by examiner

METHOD FOR TRANSMITTING DATA, METHOD FOR RECEIVING DATA, CORRESPONDING DEVICES AND PROGRAMS

BACKGROUND OF THE INVENTION

Field of the Disclosure

The disclosure relates to the field of communications networks. The technique relates more particularly to the transmission of data in wireless communications networks. The technique relates even more specifically to the securing of data transmission in energy-saving wireless communications networks. Generally, such securing takes place by the transmission of encrypted data. The present technique also relates to the transmission of encrypted data in an energy-saving communications network, the communications devices of which have limited quantities of memory.

Description of the Related Art

Data encryption techniques are used when data transmitted through a communications network needs to be protected. There are numerous data encryption techniques. These can be divided into two general classes: symmetrical encryption in which each of the parties that are communicating know a key that is used to both encrypt and decrypt the data; and asymmetrical encryption based on a pair of keys: a public key and a private key. These two classes of encryption techniques are used to resolve particular problems of data encryption. For example, symmetrical encryption is adapted to the secured saving of data. Indeed, since data is not intended for transmission to a third party, it is simpler to have a single key to encrypt this data, said key being kept by the user so that this data can be re-accessed. Conversely, when data has to be exchanged through a communications network, the use of symmetrical encryption is preferable. For example, during a communications session, two entities wishing to communicate generate two pairs of private/public keys. These two pairs of keys are used to encrypt and decrypt data after their transmission.

Symmetrical cryptography is used on a large scale because it is capable of providing important functions such as high-bit-rate, low-cost encryption, message authentication and efficient hashing. The term used for example is "authenticated encryption", designed to provide data confidentiality as well as data integrity and authenticity. Thus, symmetrical encryption algorithms are used in mobile telephones, credit cards and other cases of wireless connections. These functions rely on the use of cryptographic primitives such as block encryption, stream encryption or hash functions. Block encryption is a reliable and efficient technique: algorithms designed over the past decade are still capable of withstanding any hacking attempt in a classic context. Thus, resistance to statistical attacks on the AES algorithm (a much used symmetrical primitive) has been proven. The AES algorithm offers sufficient performance for a wide range of contexts of use.

A primitive symmetrical such as AES is considered to be reliable in classic security models when it is difficult to distinguish its outputs from random strings. However, in many applications, cryptography is used in the context where hackers or attackers have access to information channels known as auxiliary information channels which are not covered in classic security models. For example, an implementation of a pay television system must be protected against a hacker who has physical access to the equipment and can measure certain physical variables when making calculations in order to retrieve the key. In extreme cases, the hacker can even have the capacity to read the memory and extract the keys therefrom. Such attacks are called concealed channel attacks.

In such contexts, numerous implementations are vulnerable to attacks made through concealed channels. Besides, the designing of a block encryption algorithm is limited to the definition of one parameterized permutation per key. They are often used to protect the confidentiality or the integrity of a piece of data. To this end, they must be formed according to an appropriate method of operating. Thus, most applications seeking to protect the confidentiality of a piece of data also require the protection of its integrity. This situation leads to a great need for efficient methods of operation combining these two properties.

Besides, the situation made even more complex by the appearance of new needs and novel applications. Indeed, existing implementations are suited to certain types of devices: these are devices that have major resources at their disposal, in terms of both computation power and memory. Indeed, present-day communications terminals such as smart phones or tablets are equal to personal computers or laptops. However, existing implementations are not suited to devices using energy-efficient networks: these are for example connected objects that use energy-efficient communications networks, of the LORA type. In this type of communications network, it is necessary not to over-use the resources needed to ensure long service life for the devices (so as not to use too many resources, for example batteries). Indeed, one of the characteristics of objects known as connected objects is that they work on batteries. Now, the function that most uses this battery is the communications function (data reception and transmission). Thus present applications, which use many resources for cryptographic computations and many resources for data transmission/reception, are not suited to the Internet of Things.

There is therefore a need to provide an implementation of this kind.

SUMMARY OF THE DISCLOSURE

The disclosure does not pose these problems of the prior art. More particularly, the disclosure relates to a simple solution to the problems identified here above. Indeed, the present technique relates to a method of data transmission of the type consisting of the encryption and authentication of a piece of data.

Thus, the present technique relates to a method for transmitting data implemented by a first electronic device called a sender, to a second electronic device, called a receiver, method comprising transmitting a message subdivided into blocks of data, the method being characterized in that it comprises at least one iteration of a processing step comprising:

obtaining a block of current data;
encrypting said block of current data delivering a block of encrypted data;
determining a tag as a function of said block of encrypted data;
transmitting said block of encrypted data;

and in that it comprises at least one step for transmitting at least one tag according to a predetermined transmission scheme.

Thus, the present technique distributes control values throughout the transmission of the encrypted data. This prevents a receiver from downloading the entire transmitted message when an error is detected.

According to one particular characteristic, the step for transmitting at least one tag is performed at each iteration of the processing step.

According to one particular characteristic, the size of said tag $b_i$ is from 1 bit to 8 bits.

According to one particular characteristic, said method for transmitting comprises, prior to the processing step, a step for obtaining an encryption key k, called a session key.

According to another aspect, the present disclosure also relates to an electronic data transmission device, called a sender, comprising means for transmitting data to be sent to a second electronic device called a receiver, the device comprising means for transmitting a message subdivided into blocks of data. Such a device comprises iterative processing means comprising:

means for obtaining a block of current data;
means for encrypting said block of current data delivering a block of encrypted data;
means for determining a tag $b_i$ as a function of said block of encrypted data;
means for transmitting said block of encrypted data;

and it comprises means for transmitting at least one tag $b_i$ according to a predetermined transmission scheme.

According to another aspect, the present technique also relates to a method for receiving data, coming from a transmission device. Thus, the technique relates to a method for receiving data representing a message subdivided into blocks of data, the method being implemented by an electronic device called a receiver device. Such a method comprises at least one iteration of the following steps:

a step for receiving a block of encrypted data;
a step for receiving a tag $b_i$ corresponding to a signature of said block of encrypted data;
a step for verifying a validity of the received tag relative to an expected tag; and
when said received tag is different from said expected tag, a step for differentially processing at least one previously received valid block of encrypted data.

According to one particular embodiment, said step for receiving a block of encrypted data comprises a step of inserting said block of encrypted data into a first queue of a predetermined size.

According to one particular embodiment, said step for differentially processing at least one previously received valid block of encrypted data comprises:

a step for determining a location of invalidation within a second queue;
at least one step for processing data inserted into the second queue up to the location of invalidation;
a step for stopping the processing.

According to another aspect, the present technique also relates to an electronic device for receiving data, called a receiver device, said data representing a message subdivided into blocks of data. Such a device comprises iterative processing means comprising:

means for receiving a block of encrypted data;
means for receiving a tag $b_i$ corresponding to a signature of said block of encrypted data;
means for verifying a validity of said received tag relative to an expected tag; and
means for differentially processing at least one previously received valid block of encrypted data, implemented when said received tag is different from said expected tag.

According to a preferred implementation, the different steps of the methods according to the disclosure are implemented by one or more software programs or computer programs comprising software instructions to be executed by a data processor of a device according to the disclosure and being designed to control the execution of the different steps of the methods.

The disclosure is therefore also aimed at providing a program that can be executed by a computer or by a data processor, this program comprising instructions to command the execution of the steps of a method as mentioned here above.

This program can use any programming language whatsoever and can be in the form of a source code, object code or a code that is intermediate between source code and object code, such as in a partially compiled form or in any other desirable form.

The disclosure also aims to provide an information carrier readable by a data processor and comprising instructions of a program as mentioned here above.

The information carrier can be any entity or device whatsoever capable of storing the program. For example, the carrier can comprise a storage means such as a ROM, for example a CD ROM or a microelectronic circuit ROM or again a magnetic recording means, for example a floppy disk or a hard disk drive.

Again, the information carrier can be a transmissible carrier such as an electrical or optical signal which can be conveyed via an electrical or optical cable, by radio or by other means. The program according to the disclosure can be especially uploaded to an Internet type network.

As an alternative, the information carrier can be an integrated circuit into which the program is incorporated, the circuit being adapted to executing or to being used in the execution of the method in question.

According to one embodiment, the proposed technique is implemented by means of software and/or hardware components. In this respect, the term "module" can correspond in this document equally well to a software component and to a hardware component as to a set of hardware and software components.

A software component corresponds to one or more computer programs, one or more sub-programs of a program or more generally to any element of a program or a piece of software capable of implementing a function or a set of functions as described here below for the module concerned. Such a software component is executed by a data processor of a physical entity (terminal, server, gateway, router, etc) and is capable of accessing hardware resources of this physical entity (memories, recording media, communications buses, input/output electronic boards, user interfaces, etc).

In the same way, a hardware component corresponds to any element of a hardware unit capable of implementing a function or a set of functions as described here below for the module concerned. It can be a programmable hardware component or a component with an integrated processor for the execution of software, for example an integrated circuit, a smart card, a memory card, an electronic board for the execution of firmware, etc.

Each component of the system described here above naturally implements its own software modules.

The different embodiments mentioned here above can be combined with one another to implement the proposed technique.

BRIEF DESCRIPTION OF THE DRAWINGS

Other features and advantages of the proposed technique shall appear more clearly from the following description of a preferred embodiment, given by way of a simple illustratory and non-exhaustive example and from the appended drawings, of which.

DETAILED DESCRIPTION

Figure 1:
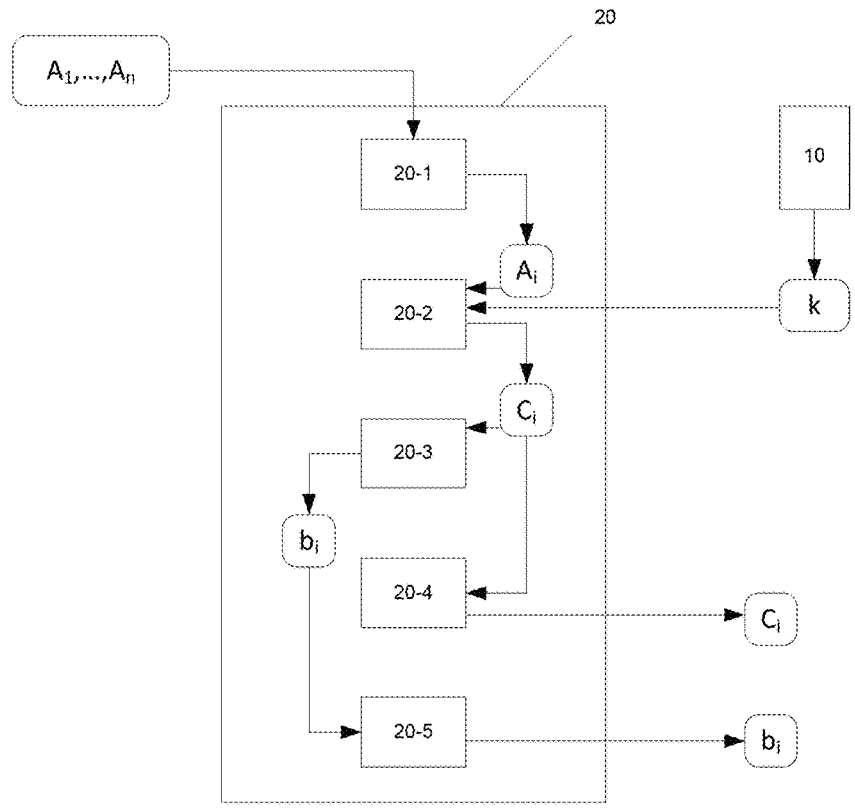
FIG. 1 is a block diagram of the proposed technique for the transmission of data.

Authenticated encryption is an approach used to implement confidentiality of data exchanged and to ensure the integrity of this data at the same time. Authenticated encryption can be distinguished from simple encryption on the one hand and the generation of the message authentication codes (MAC) on the other hand.

Authenticated encryption generally produces messages of the following form: where C is an encrypted message and B is a tag. Depending on the embodiments, the tag B is computed either on the encrypted message or on the decrypted message (clear-text message). One drawback of this approach is that the full message C must be received (and recorded) before the tag B can be verified. If the encrypted message C happens to be incorrect (i.e. if the received tag does not correspond to the expected tag computed by the receiver), then it means that the reception step was carried out for nothing, causing a major loss of resources for the receiver (in terms of time spent, energy used, bandwidth consumed, random-access memory used). This approach is clearly not appropriate to low-consumption communications networks or to devices having low processing capacities (especially in terms of available random-access memory).

Thus, to overcome the known problems of the prior art, a novel method is described here below for authenticated encryption on the fly that comprises constant latency and has proven security against a model of hacker assumed to have full access to the information on the behavior of the reception system.

The general principle of the technique described therefore consists in computing tags representing signatures of the blocks of data and in hiving off tags throughout the transmission of these blocks of encrypted data, from the sender to the receiver. Thus, this hiving-off process enables the receiver to more speedily note the fact that a received data block does not correspond to an expected data block and that it therefore does not have to store the message C in its totality before processing it. Thus, a large quantity of random-access memory is saved and the use of the bandwidth of the network is limited. In other words, the disclosure relates to a method for transmitting data and to a corresponding method for receiving data. According to the disclosure, the method for transmitting data carries out a cryptographic processing of the data to be transmitted after this data has been pre-divided into blocks of data and it computes a tag representing each block of encrypted data. The tag is then transmitted in such a way that a hacker is not capable of reproducing an accurate transmission of tags. The reception method for its part ensures that, when an incorrect tag is received (because of an attempted attack), the processing of the blocks of data is not immediately stopped but a differential processing is implemented in order to jam any attempt to analyze the behavior of the receiver.

Jamming is therefore done both at the transmitter which transmits tags in such a way that they are difficult to interpret by the hacker (because of the size of the data, the frequency of its transmission or its position in the transmission), and at the receiver which processes this data differentially, i.e. the reception of fraudulent data (which is assumed to have been created by the hacker) does not necessarily lead to an immediate interruption of processing (which would give the hacker a clue about the place at which his attack has failed).

Other features of the present technique consist of:
  a mechanism for detecting a one-time use value or nonce value that prevents the reutilization of such a value in order to build an attack by replay, and
  a mechanism for taking account of the received differential data: this mechanism builds resistance against the hacker:
    for example, the differential processing of the received data can consist of a variable stopping-time mechanism which limits the leakage of information in the event of error;
    another example of differential processing consists in continuing to accept the reception of data known to be false: then, random processing operations are performed on this data, these processing operations comprising both real processing steps and random processing steps.

The general construction of the method is designed for transmitter and receiver devices having low computation capacity while limiting exchanges on (IdO/5G/Big Data) communications networks.

The general principle of the technique thus consists in dispersing (hiving off) tags in the encrypted message itself, so that the authentication of the received data can be done on the fly. If an error takes place, the rest of the message can be abandoned. In a formalized way, a message transmitted by the transmitter and received by the receiver has the following form:

$$C_1|b_1|C_2|b_2| \ldots |C_n|b_n$$

where $C_i$ are blocks of encrypted text and the values $b_i$ are short tags (the size of which is from 1 to 8 bits). This is a transmission scheme for transmitting uniform tags: a tag $b_i$ is transmitted after each data block. Other transmission schemes for the tags are described here below. According to one variant, a value $b_i$ is a unique bit, the value of which can be 0 or 1. It is assumed that a shared key k has been previously constructed or determined between sender and receiver. As presented here below, the location, the frequency and the value of $b_i$ which are dispersed in the message as and when it is transmitted, are chosen to make the task of a hacker more complicated.

The hacker model has precisely been deliberately chosen to be stronger and better informed than traditionally considered models. It is assumed that the hacker can listen, insert, modify or reorganize the packets transmitted to the receiver and that it can observe the behavior of the intended recipient so as to determine whether these changes have an effect on the stopping or continuance of the reception of data (and the continuance of the processing operations underlying the reception of this data): this is an attack by malleability. For example, the hacker can try to transmit a video stream to his victim and is then in a position to detect a failure of this transmission when the video stops. Using this model, it can be ensured that no malicious data block can be created. This assurance is provided with high probability.

According to the present technique, to withstand malleability attacks, the value of a given $b_i$ must depend on all the blocks $(C_1, \ldots, C_i)$ previously transmitted, namely:

$$b_i = Fk(H(C_1 | \ldots | C_i))$$

where H is a hash function and Fk is a PRF ("Pseudo Random Function Family"). In cryptography, a pseudo-random function family or PRF, is a collection of functions that can be efficiently calculated and emulate a random oracle as follows: no efficient algorithm can distinguish (with significant advantage) between a function chosen at random in the PRF family and a random oracle (a function for which the outputs are fixed completely at random).

On its own, such a mode of data transmission is already capable of countering a standard attack, an attack that does not take account of the exchanges already made previously.

However, given the model of adversary chosen, such a mode of transmission can be attacked by an active hacker as follows: when the hacker observes that malicious message which he is trying to transmit is rejected at the position "i", which mean that the tag $b_i$ is incorrect. It is enough for the hacker to try to transmit a new value $b_i$ and have the entire message sent again. It is thus theoretically possible to find the correct $b_i$ (i.e. the correct value of $b_i$) for all the successive "i" values.

Now, one of the goals of the present disclosure is precisely to be able to resist such behavior on the part of the adversary in at least one embodiment. Thus, in the following embodiment, a technique is described for preserving the level of security provided by the present technique even in the presence of an adversary having access to the receiver, access that makes it possible to determine the behavior of the receiver.

Figure 2:
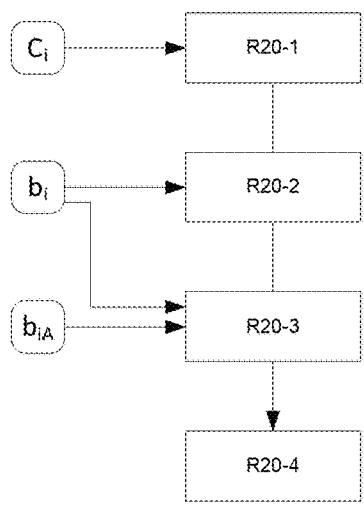
FIG. 2 presents a block diagram of the proposed technique for the reception of data.

The general principle of the present technique comprises a method for transmitting data on the one hand (FIG. 1) and a method for receiving data on the other hand (FIG. 2).

Thus, a method of data transmission is proposed, implemented by a first electronic device, called a sender, to a second electronic device, called a receiver, the method comprising the transmission of a message subdivided into blocks of data $(A_1, \ldots, A_n)$. The method of transmission comprises at least one iteration of a processing step (20) comprising:

obtaining (20-1) a block of current data $A_i$;
encrypting (20-2) said block of current data $A_i$, delivering a block of encrypted data Ci;
determining (20-3) a tag $b_i$ as a function of said block of encrypted data $C_i$;
transmitting (20-4) said block of encrypted data $C_i$;
and in that it comprises at least one step for transmitting at least one tag $b_i$ according to a predetermined transmission scheme.

The predetermined transmission scheme consists of the transmission of the tag in such a way that the hacker has difficulties, firstly in understanding when a tag is transmitted and when it is not, and, secondly, knowing the value that this tag should have. Besides, an adapted tag size is deliberately chosen. More particularly, the size of the tag is from 1 to 8 bits, so that the tag consumes little bandwidth and is easy to generate. The predetermined transmission scheme according to the present technique is a tag-transmitting scheme that brings about variation in the time, and/or frequency and/or length of the transmission of the tags. In other words, the hacker does not know (or in any case cannot be sure) of how the tags are transmitted. This so for the following reasons for example: the tags are transmitted regularly (after each data block) but have a random size each time and/or the tags are transmitted by blocks after a certain number of blocks of data (i.e. the transmission by blocks is also determined randomly) and/or only one tag is transmitted every x blocks and this tag corresponds to the tag of all the x blocks at the same time. There is therefore potentially a variation in time, frequency and length and this variation is predetermined and is based on a random and/or pseudo-random determination on the sender side. The receiver, through preliminary synchronization or by the use of functions identical to those of the transmitter, is also capable of knowing the variations used by the transmitter and therefore having knowledge of the predetermined transmission scheme.

A description is also provided of a method for receiving data, representing a message subdivided into blocks of data $(A_1, \ldots, A_n)$, a method implemented by an electronic device called a receiver device. Such a method comprises at least one iteration of the following steps:

a step (R20-1) for receiving a block of encrypted data $C_i$;
a step (R20-2) for receiving a tag $b_i$ corresponding to a signature of said block of encrypted data $C_i$;
a step (R20-3) for verifying a validity of said received tag bi relative to the expected tag $b_{iA}$; and
when said received tag $b_i$ is different from the expected tag $b_{iA}$, a step of differential processing (R20-4) of at least one previously received valid block of encrypted data.

Differential processing consists in not immediately stopping the processing of the received data, in order to make the hacker believe that the data (which the receiver device knows to be wrong) has actually been considered to be valid. Continuing to process received data as if it were valid can be done in different ways.

A typical case of use of the present technique is the implementing of one-way data transmission from a sender entity, for example a connected object, towards a receiver entity, for example an access point or a LORA gateway. Another case of use is the reverse: this is an access point type or LORA gateway type sender entity which transmits data to a connected object. The present technique can also be applied in a UNB (ultra-narrow band) type cell network.

The disclosure however is in no way limited to such an implementation and can be applied to any type of secured data transmission, for example in the context of data exchanged between two computers connected to a communications network (whether wired or wireless) or between a terminal and a server.

Description of One Embodiment

For this embodiment, a more explicit description is given of the technique described here above, assuming that the adversary is capable of interacting with the receiver in an advanced way. It is assumed especially that the adversary is capable of resending blocks of data and tags when he sees that a given tag does not make it possible to validate a previously transmitted block. To avoid this problem, this embodiment implements two techniques complementarily.

The first technique implemented consists of the use of a parameter used to compute the tags (the nonce which can be transmitted in clear-text form and is therefore not secret in principle) for each communications session from the transmitter to the receiver (for each transmission of a message). The use of a different nonce at each communications session ensures that the receiver will have the capacity to detect any reutilization of a previous nonce. Thus, the computation of the tags changes at each session, preventing a hacker from replaying blocks of data that he could have intercepted and manipulated previously. This detection capacity enables the receiver to speedily detect any attempted identity theft. As is described in detail here below, the mechanism for detecting applied at the receiver does not consume energy and does not require any two-way communication.

The second technique, implemented jointly with the first one, is that of the introducing uncertainty, on the receiver side, about the time when the tag $b_i$ is considered to be false. This technique combined with the first one disorients the hacker. Indeed, the hacker is no longer capable, even by attentively observing the operation of the receiver, to determine which are the transmitted pieces of that have caused the stoppage of data reception by the receiver.

In other words, the use of the two techniques mentioned here above makes it possible to mask or confuse the real operation of the receiver and to do so without any additional resources being required for the receiver and without substantially slowing down the transmission bit rate in the network.

Method for Transmitting Encrypted Data

In this embodiment, a different key is used at each communications session between the transmitter and the receiver.

This solution requires that a nonce should be chosen for each session. But if the nonce is transmitted with the message (as is done usually), the hacker can control the transmission of this nonce and force it to be reutilized. As a variant, the nonce can be transmitted by the receiver but this would then require a two-way communication. Now, the method of the present technique is not necessarily implemented in the context of two-way communications. Thus, to resist a "replay" type attack (the reutilization of a nonce already used by the hacker), a stateful receiver entity is built. To this end, it is possible for example to use statistical tools to determine whether a nonce is legitimate or whether it is an attempt to deceive the receiver. In this respect, it is possible for example, within the receiver, to implement an SQF (streaming quotient filter) type of receiver. According to the present disclosure, such a mechanism is particularly well suited in that it enables the efficient detection of duplicates in a data stream while having limited memory requirements. A Bloom filter type mechanism is also a possibility better known than SQF for detecting duplicates. However, this mechanism is less interesting in the application sought because it is generally more resource hungry.

It can be noted that, in any case, a hacker has a $2^{-l}$ probability of transmitting l to a receiver entity before being detected as a hacker.

The method for transmitting encrypted data according to the embodiment presently described comprises:
  a selection, as a function of an encryption key k, from among a plurality of possible encryption keys; and
at least one iteration of the following steps:
  obtaining a block of data to be encrypted $A_i$;
  encrypting said block of data to be encrypted $A_i$, by means of said encryption key k, delivering a block of encrypted data $C_i$;
  determining at least one tag $b_i$ as a function of said block of encrypted data $C_i$;
  transmitting said block of encrypted data $C_i$ and said at least one tag $b_i$.

Naturally, depending on the embodiments, it is possible to provide some variants of the method described here above in complying with two criteria: the first criterion consists in limiting, to the maximum extent, the number of tags to be transmitted in addition to the encrypted data. It is necessary to preserve a method for transmitting encrypted data that is energy efficient, and limits the quantity of surplus data (i.e. data that is not payload data). The second criterion is that of the simplicity of the processing operations performed on the reception entity side: it is necessary to preserve simple processing for the reception entity in order to make sure that the energy expenditure needed for this processing is minimal. It is also possible to define several variants of the transmission scheme for tags $b_i$, in order to make the hacker's task more complex.

Thus, in a first variant, the tags $b_i$ are distributed (transmitted) randomly or pseudo-randomly. This means that an external observer will be unable to guess when a tag $b_i$ has to be transmitted. In other words, this means that there is no predictability in the transmission of the tags. Thus, a data block $C_i$ can be followed by the transmission of a tag while the next block $C_{i+1}$ is not. This random or pseudo-random transmission of the tag is linked to the key k, previously determined for the transmission session. An operation made on the key k after the transmission of the current block makes it possible to decide on the transmission of a current tag. Naturally, this operation carried out on the key k is a secret operation.

Hence, this variant introduces variability in the value of the tag and variability of the presence of the tag.

In a second embodiment, the length of each tag is determined randomly or pseudo-randomly. This means that it would be impossible for an external observer to guess the length of a tag $b_i$. In other words, it means that there is no predictability of the length of the tags. Thus, even if a tag is transmitted after each data block, the length of this tag will not be predictable. This is also true for example of the value of the tag. For example, a tag $b_i$ can have a length of 1 bit: the tag can then take the value 0 or the value 1. The next tag can have a length of 2 bits: the tag can then take the values '00' or '01' or '10' or '11'. Since the hacker is in no position to know the length of the tag, he finds it even more difficult to guess its value. The computation of this value of the tag is carried out by implementing a secret function based on the key k.

A third variant combines the first and second variants.

A fourth variant consists of the combination of the first and second variants, with the addition of additional function: it is assumed that the standard length of a tag is 1 bit. In this fourth variant, subsequently to the encryption of the block $C_i$, the following operations are performed in implementing a secret function dependent on the key k:
  computation of the presence of a tag $b_i$;
  computation of the length of the tag $b_i$, as a function of the last tag transmitted;
  computation of the value of each bit of the tag bi as a function of the previously encrypted blocks $C_i$, (and $C_{i-1}$, $C_{i-2}$, etc.);
In other words, subsequently to the encryption of a block Mi, a function depending on the key k makes it possible to:
  determine whether a tag is transmitted or not;
  determine the length of this tag as a function of the length of the previously transmitted tags;
  determine the value of the bits forming this tag as a function of the previously transmitted blocks.

Such an implementation does not mean that the tag $b_i$ depends on all the previous tags. For example, if the previously transmitted tag $b_i$ had a length of 1 bit and depended on the block $C_i$ (and on the preceding blocks), the tag $b_{i+1}$ for its part, and totally independently, can have a length of 2 bits, the first bit depending on the block $C_{i-1}$ (and on the preceding blocks) and the second bit depending on the block $C_{i+1}$ (and on the preceding blocks). The advantage of this embodiment is the same if the hacker has all the unit values (0 or 1), corresponding to each block. The hacker cannot guess the way in which the data will be transmitted: indeed, since the distribution of these values is random or pseudo-random, in being linked to a session key k, the hacker cannot guess what the distribution of these keys will be.

Method for Receiving Encrypted Data

As already indicated here above, it is a goal of the present disclosure, in addition to consuming little energy, bandwidth and memory on the receiver side, to withstand attacks by concealed channels. It is assumed indeed that a possible hacker is capable of having access to the data-receiving receiver device for receiving data and that he is capable of observing the behavior of this device in order to determine the right data to be transmitted in the case of identity theft or an attack. It is known that concealed channel attacks are based on the observation of various parameters representing a certain type of activity. This means that to make this observation more difficult, the method for receiving encrypted data comprises, in addition to the steps of receiving encrypted data C and the tag B, steps for masking the processing carried out during the reception of data. More particularly, these masking steps are simple and do not require complex computations. Indeed, it is not desirable that the receiver should make excessively intensive computations. This would have a negative influence on its autonomy.

Figure 3:
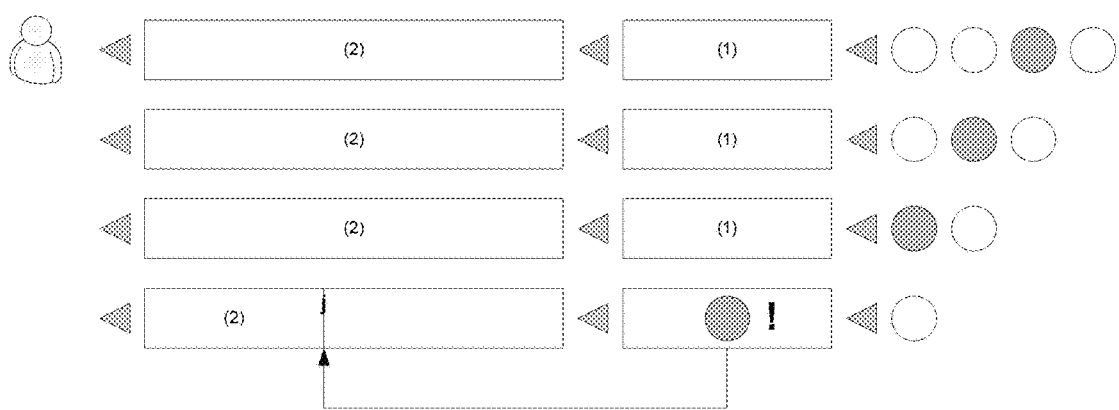
FIG. 3 describes an embodiment of a technique for the differential processing of data, in the receiver.

Thus, to avoid having to accept and process blocks of malicious data while at the same time adding uncertainty (with respect to the hacker) about the blocks of data that have caused the stoppage (and therefore by introducing uncertainty about the processing time as such, the disclosure introduces (see FIG. 3) two FIFO queues in random-access memory: the queue (1) to the right in the diagram and the queue (2) to the left in the diagram.

The blocks of data are inserted into the queue (1) as and when they arrive. The queue (1) comprises the space needed for 128 blocks of data. The probability that the adversary has succeeded in generating a sequence of 128 accurate tags $b_i$ is $2^{-128}$. Thus, when a block ($C_i$) of data leaves the queue (1) (because this queue is full), this block is considered to be valid with a high probability. The blocks coming out of the queue (1) are introduced into the queue (2) which has the size m. The packets coming out of the queue (2) are then used (if they are correct).

When a data block $C_i$, situated in the queue (1) is detected as being incorrect (because the tag to which this data block corresponds is incorrect), the following processing procedure is applied:
  a position j, in the queue (2), is selected by chance (for example according to a procedure described here below); the position j is the location of invalidation;
  all the blocks of data situated after the position j in the queue (2) are transmitted for processing;
  the communication is stopped.

In other words, when an incorrect data block is detected in the queue (1), a point in time (represented by the location of invalidation j) is determined, after which, in the queue (2), the previously transmitted blocks of data will not be processed. This technique has two advantages: the first is that it minimizes the risk of accepting a data block that might have "escaped" the processing operation for verifying the tags $b_i$. Indeed, by giving up the processing in the queue (2), it is ensured that even if a data block of the queue (1) has been wrongly taken to be correct, it will not have the time to be included for subsequent processing. The second advantage, as explained here above, is that the hacker is incapable of finding out which tag (of the data block) has caused the processing to be interrupted. This means that if he wishes to make a fresh attempt, the hacker must obtain the new session key on the one hand and create a new sequence of blocks of encrypted data and a new sequence of tags on the other hand, without being certain however that this new attempt will lead to a better result.

A question arises on the way in which the location j is selected. It is necessary indeed to prevent this location from being predicted by the hacker, otherwise the entire procedure would be useless.

Two selection variants, at least, can be envisaged:
  the first variant consists of the selection of the location j as a function of the message transmitted; this is a deterministic selection, made by the receiver as a function of the content of the message itself;
  the second variant consists of the selection of the location j randomly according to a given distribution.

Without going into the mathematical details which are not the object of the present disclosure, it must be said that the inventors have shown that a random selection according to a uniform distribution of probability is an efficient manner of selecting a location j.

Other parameters can be efficiently adjusted according to the embodiments to increase the efficiency of the process that has just been described. For these parameters especially we can adjust:
  the size m of the queue (2): the greater the length of the queue, the greater the time needed for the hacker to find out which is the data block or the tag that is defective (i.e. the one that has enabled the attack to be detected); the trade-off here is greater latency in the processing;
  in the same way, the size of the queue (1) can be adjusted so as to reduce the risks of fraudulent introduction of a data block into the queue (2); this has already been explained here above;
  as a corollary, an important parameter for detecting relates to the quantity of memory available to carry out processing operations for accepting tags at the receiver; the greater the quantity of memory, the higher the level of security.

Other Characteristics and Advantages

Figure 4:
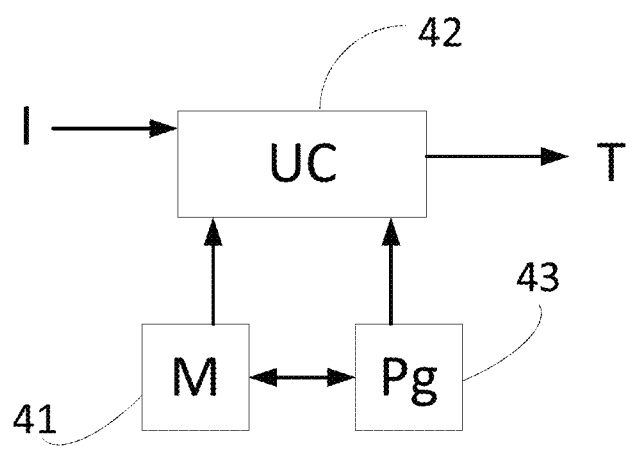
FIG. 4 is a summary description of the architecture of an electronic transmission device.

Referring to FIG. 4, we describe a sender device implemented to transmit encrypted data according to the method described here above.

For example, the sender device comprises a memory 41 constituted by a buffer memory, a processing unit 42, equipped for example with a microprocessor and driven by the computer program 43 implementing a method for transmitting encrypted data. At initialization, the code instructions of the computer program 43 are for example loaded into a memory and then executed by the processor of the processing unit 42. The processing unit 42 inputs at least one piece of data representing a message M to be transmitted to a receiver. The microprocessor of the processing unit 42 implements the steps of the method of transmission according to the instructions of the computer program 43 to subdivide the message into blocks of data, encrypt each data block by means of an encryption key k and compute the tags b (representing signatures associated with the blocks of encrypted data) and transmit the blocks of encrypted data and the tag b according to a transmission scheme. As explained here above, this transmission scheme can be deterministic and depend on the encryption key.

To this end, the sender device comprises, in addition to the buffer memory 41, communications means such as a network communications modules, data transmission means and as the case may be a dedicated encryption processor.

All these means can take the form of a particular processor implemented within the device, said processor being a secured processor. According to one particular embodiment, this device implements a particular application which is in charge of the performance of the encryption and of the data transmission, this application being for example provided by the manufacturer of the processor in question in order to enable the use of said processor. To this end, the processor comprises unique identification means. These unique identification means ensure the authenticity of the processor.

Besides, the transmitter device furthermore comprises means for obtaining encryption keys according to a stateful model, means to obtain a new encryption key at each new session of data transmission.

Figure 5:
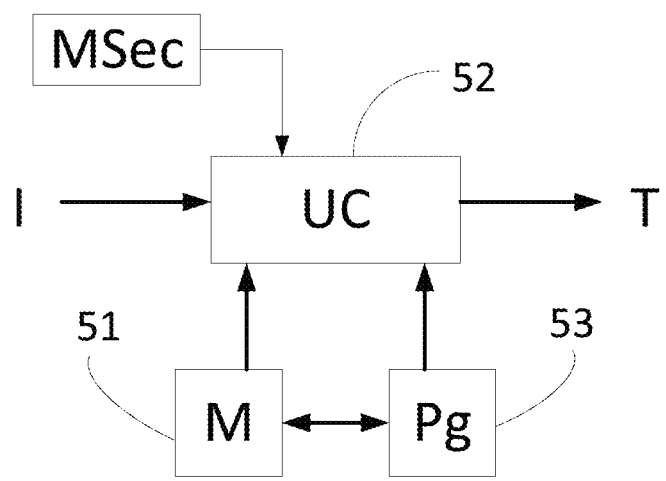
FIG. 5 is a summary description of the architecture of an electronic reception device

Referring to FIG. 5, we describe a receiver device implemented to receive encrypted data coming from a sender device according to the method described here above.

For example, the receiver device comprises a memory 51 comprising a buffer memory, a processing unit 52 equipped for example with a microprocessor and driven by the computer program 53 implementing a method for receiving encrypted data.

At initialization, the code instructions of the computer program 53 are for example loaded into a memory and then executed by the processor of the processing unit 52. The processing unit 52 inputs at least one block of encrypted data and at least one tag b representing a signature of a block of encrypted data. The microprocessor of the processing unit 52 implements the steps of the reception method according to the instructions of the computer program 53 to control the validity of the tags received according to the blocks of encrypted data and carries out a differential processing of the data received according to the validity of these tags.

To this end, the device comprises, in addition to the buffer memory 51, communications means such as network communications modules, data transmission means and as the case may be an independent encryption processor.

All these means can take the form of a particular processor implemented within the receiver device, said processor being a secured processor and/or making use of a secured memory (Msec). According to one particular embodiment, this device implements a particular application which is in charge of the reception and control of the received data, this application being for example provided by the manufacturer of the processor in question in order to enable the use of said processor. To this end, the processor comprises unique identification means. These unique identification means ensure the authenticity of the processor.

Besides, the receiver device also comprises means for obtaining encryption keys according to a stateful model, means used to obtain a new encryption key at each new session of data transmission.

Depending on the embodiments, the receiver device also comprises means for managing at least two queues for processing received data. More particularly, the receiver device can include a first physical memory of predetermined size, in which the blocks of encrypted data are inserted during (or after) the verifying of the validity of the tags that accompany these blocks of encrypted data. The receiver device can also comprise a second physical memory, of a predetermined size, in which the blocks of encrypted (or decrypted) data are inserted after the processing of verification of the validity of the tags. The two queues can also be created in the secured memory (Msec) of the receiver device when this device is provided with such a memory. This makes the task of data interception and that of understanding the operation of the receiver device even more complicated.

The invention claimed is:

1. A method for transmitting data implemented by a first electronic device, called a sender, to a second electronic device, called a receiver, method comprising transmitting a message subdivided into blocks of data wherein the method comprises at least one iteration of:
obtaining of a block of current data $A_i$;
encrypting said block of current data $A_i$, by means of an encryption key k, delivering a block of encrypted data $C_i$;
determining a tag $b_i$, having a random or pseudo-random length, as a function of said block of encrypted data $C_i$, the length of the tag $b_i$ being obtained by implementing a secret function based on the encryption key k;
transmitting of said block of encrypted data $C_i$;
and wherein the method comprises transmitting at least one tag $b_i$ according to a predetermined transmission scheme.

2. The method for transmitting according to claim 1, wherein the transmitting of at least one tag is performed at each iteration of the processing of a block of data $A_i$.

3. The method for transmitting according to claim 1, wherein the size of said tag $b_i$ is from 1 bit to 8 bits.

4. The method for transmitting according to claim 1, wherein said method for transmitting comprises, prior to the processing of a block of data $A_i$, obtaining an encryption key k, called a session key.

5. A method for receiving data representing a message subdivided into blocks of data, method implemented by an electronic device called a receiver device, wherein the method comprises at least one iteration of:
receiving a block of encrypted data $C_i$ corresponding to a block of data $A_i$ of the message encrypted by means of an encryption key k;
receiving a tag $b_i$ corresponding to a signature of said block of encrypted data $C_i$, said tag $b_i$ having a random or pseudo-random length obtained by implementing a secret function based on the encryption key k;
verifying a validity of said received tag $b_i$ relative to an expected tag $b_{iA}$; and
when said received tag $b_i$ is different from said expected tag $b_{iA}$, differentially processing at least one previously received valid block of encrypted data.

6. The method for receiving data according to claim 5, wherein said receiving of a block of encrypted data $C_i$ comprises inserting said block of encrypted data $C_i$ into a first queue of a predetermined size.

7. The method for receiving data according to claim 5, wherein said differentially processing at least one previously received valid block of encrypted data comprises:
determining a location of invalidation j, within a second queue;
processing data inserted into the second queue up to the location of invalidation j;
stopping the processing.

8. An electronic data transmission device, called a sender, for transmitting data to be sent to a second electronic device called a receiver, a message subdivided into blocks of data, wherein the electronic device comprises a data processor and a non-transitory computer-readable medium comprising instructions stored thereon, which when executed by the data processor configure the device to perform acts comprising:
obtaining a block of current data $A_i$;
encrypting said block of current data $A_i$ by means of an encryption key k, delivering a block of encrypted data $C_i$;

determining a tag $b_i$, having a random or pseudo-random length, as a function of said block of encrypted data $C_i$, the length of the tag $b_i$ being obtained by implementing a secret function based on the encryption key k; and transmitting said block of encrypted data $C_i$;

wherein the electronic device transmits at least one tag $b_i$ according to a predetermined transmission scheme.

9. An electronic device, called a receiver device, for receiving data representing a message subdivided into blocks of data wherein the electronic device comprises a data processor and a non-transitory computer-readable medium comprising instructions stored thereon, which when executed by the data processor configure the device to perform acts comprising:

receiving a block of encrypted data $C_i$ corresponding to a block of data $A_i$ of the message encrypted by means of an encryption key k;

receiving a tag $b_i$ corresponding to a signature of said block of encrypted data $C_i$, said tag $b_i$ having a random or pseudo-random length obtained by implementing a secret function based on the encryption key k;

verifying a validity of said received tag $b_i$ relative to an expected tag IDA; and differentially processing at least one previously received valid block of encrypted data, implemented when said received tag $b_i$ is different from said expected tag $b_{i,A}$.

* * * * *